May 8, 1962  YOSHIO AKIOKA ETAL  3,033,075
ELECTRIC EXPOSURE METER FOR CINE-CAMERA
Filed July 31, 1958  2 Sheets-Sheet 1
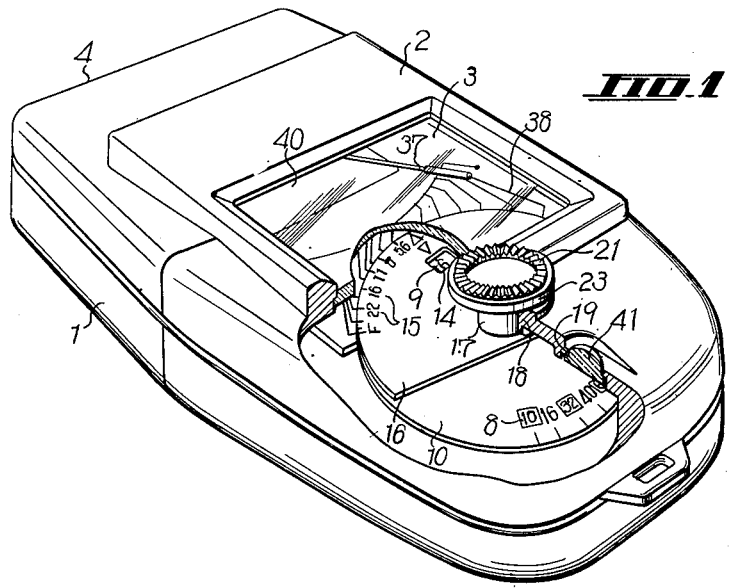
INVENTORS
Yoshio Akioka
Yoshio Mishika
BY
Michael S. Striker
Attorney May 8, 1962  YOSHIO AKIOKA ETAL  3,033,075
ELECTRIC EXPOSURE METER FOR CINE-CAMERA
Filed July 31, 1958  2 Sheets-Sheet 2
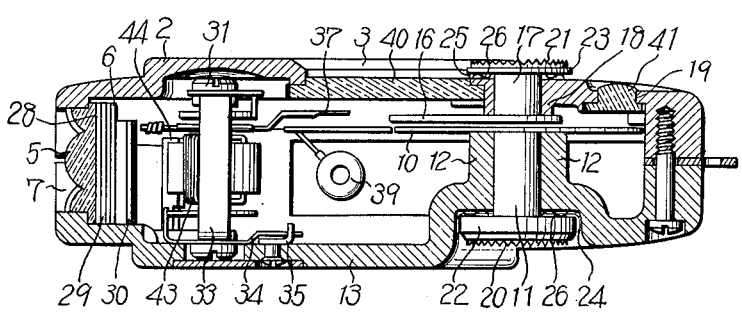
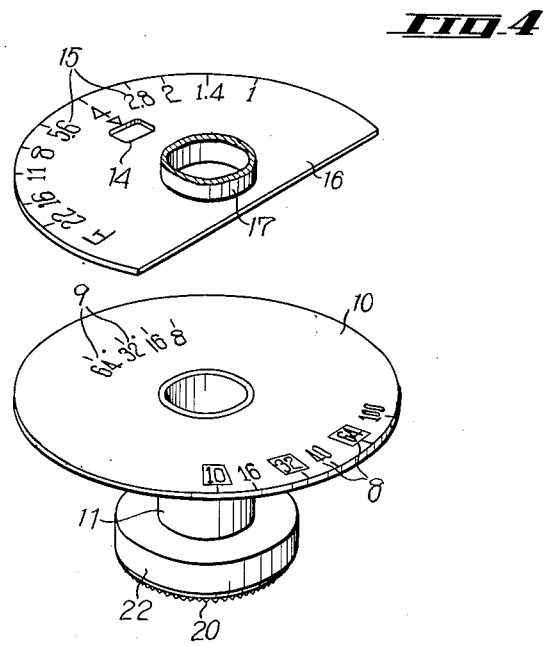
INVENTORS
Yoshio Akioka
Yoshio Nishikwa
BY Michael S. Striker
Attorney

United States Patent Office 3,033,075
Patented May 8, 1962

3,033,075
ELECTRIC EXPOSURE METER FOR
CINE-CAMERA
Yoshio Akioka, Meguro-ku, Tokyo, and Yoshio Mishina, Toshima-ku, Tokyo, Japan, assignors to Seiko Denki Kogyo Kabushiki Kaisha, Tokyo, Japan
Filed July 31, 1958, Ser. No. 752,245
Claims priority, application Japan Dec. 14, 1957
13 Claims. (Cl. 88—23)

This invention relates to an electric photographic exposure meter for cameras containing dials within a case.

An object of the present invention is to provide an electric exposure meter for cameras wherein, as the dials are contained within the case, dust can be prevented from coming between the dials, while the case can be made so thin as to be conveniently carried. Another object is that any required diaphragm number value can be seen and read at a glance.

An important object is to arrange the scale members and dials in such a manner that the emulsion speed scale is not influenced by the setting of other scales.

Dials for calculating the amount of exposure are provided outside the body of a conventional electric exposure meter. Therefore, dust has easily accumulated in the clearances between the overlapped dials during the use and enters the case to interfere with the smooth rotation of the dials. According to the present invention, the dials are contained within the case and the rotary shafts operatively connected with them are exposed outside the case, so that dust can be prevented from entering the case and at the same time each dial once set will be retained and held by a corrugated spring so as not to be rotated by mere friction or impact.

Another advantage of this invention is that, as the dials are contained within the case as described above, the micrometer is located on one side within the case and the dials are located on the other side and that therefore the total thickness of the case can be reduced by the thickness of the dials as compared with exposure meters having the dials outside of the case. After the emulsion speed of the film is set, it remains in position while the number of frames to be exposed is set, and the diaphragm number value can be seen and read at a glance. An embodiment of the present invention will be described hereinafter with reference to the drawings in which:

FIGURE 1 is a partly sectioned perspective view of an electric exposure meter for motion picture cameras according to the present invention;

FIGURE 2 is a partly sectioned plan view of the same;

FIGURE 3 is a vertically sectioned side view on line A—A in FIGURE 2 and

FIGURE 4 is a perspective view showing graduations made on a semicircular dial and a circular dial overlapped with each other.

In the drawings, 1 is a case for an electric exposure meter for cameras according to the present invention. A window 3 is made on the upper portion 2 of the case and has a transparent cover 40. An opening 7 for fitting a compound lens 5 and a photoelectric cell 6 is made on the front end portion 4. A bearing part 12 supports a rotary shaft 11 to which is secured a circular dial scale member 10 marked with emulsion speed graduations 8 and with exposed frame number graduations 9 is provided on the lower portion 13. Window 3, 40 is located in a position opposite frame number graduations 9 marked on the circular dial 10. A bearing part 18 on portion 2 supports a rotary shaft 17 for a semicircular dial scale member 16 marked with diaphragm number value graduations 15. Scale member 16 has a cut out 14 exposing graduations 9. A small window 19 with a lens 41 through which the film emulsion speeds 8 marked on the circular dial 10 can be seen and read is provided in the upper portion 2. Small rotary knobs 22 and 23 serrated with teeth 20 and 21, respectively, are secured to the rotary shafts 11 and 17, respectively. An annular corrugated spring 26 is fitted in each of the clearances 24 and 25 between knob 22 and the lower portion 13 and between knob 23 and the upper portion 2, respectively, so that the rotary shafts 11 and 17 may be always kept resiliently pressed outward to prevent any accidental rotation of the circular dial 10 and semicircular dial 16. An inwardly projecting wall 27 is provided inwardly of the opening 7. The compound lens 5, plate 28, lead frame 29 and photoelectric cell 6 are fitted in the opening 7 and are resiliently pressed against the wall 27 by means of a spring piece 30. An electric current generated in the photoelectric cell 6 by the incidence of light will be supplied to ampere meter having a shaft 32 and a yoke 33. 34 is an arm to adjust the zero position of the pointer. 35 is a metal lever for adjusting arm 34 and 36 is an iron piece to shield stray magnetism. 37 is a pointer, 42 is a magnet, 43 is a coil and 44 is a magnet support. Guide lines 38 are provided on a plate on the same plane as of the scale disk 10 to associate the positions of the pointer 37 with the diaphragm number value graduations 15 marked at regular intervals on scale member 10.

The manner of the operation of the product of the present invention will now be described. The film emulsion speed graduation 8 on the circular scale member dial 10 appearing the small window 19 is adjusted by depressing knob 22 against resiliency of the corrugated spring 26 and turning the knob so as to set the emulsion speed of the film loaded in the camera. The frame number graduation 9 marked on the circular dial 10 appearing in the cut out 14 is adjusted by rotating the semicircular dial 16 through knob 23 while pressing down the rotary knob 23 until the number of frames set in the camera is indicated. Then, when the opening 7 of the exposure meter is directed to an object to be filmed, the electric current generated in the photoelectric cell 6 by the light projected into the opening 7 will flow to the electric meter 31 and will displace the pointer 37. When the guide line 38 at the point indicated by the pointer 37 is traced, a diaphragm number graduation 15 on the semicircular dial 16 will be found and read.

As shown in FIGURE 4, on the circular dial 10, the graduations representing the ASA emulsion speeds are marked on one side and the frame numbers per minute are marked on the opposed side. The frame number cut out 14 is made in the middle of the semicircular dial 16. The diaphragm number graduations are marked at regular intervals on the semicircular periphery. Therefore, when, for example, the film speed is ASA 40 and the selected frame number is 16 frames, if the graduation of 40 in the ASA emulsion speed graduations on the circular dial 10 is first adjusted to be in the small window 19 by rotating the circular dial 10 and the frame number cut out 14 is adjusted to be on the frame number graduation 16 of the indicia scale 9 on the circular dial 10 by rotating the semicircular dial 16, the diaphragm number graduations 15 will be set in a position indicated by certain guide lines 38 as shown in FIGURE 2.

Thus, the position occupied by the diaphragm number graduations 15 in the exposure meter according to the present invention will vary in accordance with the variation of the state of combination of the sensitivity and emulsion speed of the film to be used and the frame speed at the time of filming. The indicated diaphragm value will be varied and indicated by the pointer 37 which moves according to the brightness of the object to be filmed.

After the film sensitivity and the exposed frame number are set, the diaphragm number value can be directly read according to the deviation of the pointer. Therefore, the filming state can be quickly prepared. Once the emulsion speed is set by turning knob 20, this knob need not be operated, since only knob 21 on the other side of the case is used for calculating aperture stops, frame numbers, or other time depending factors. At the same time, as the dials are contained within the case, dust can be prevented from coming between the dials and the dials can be prevented from being rotated by accidental impact and friction from outside. Further, as described above, as the electric meter is located at one end and scale members are located at the other end of the case, the exposure meter is thin and convenient to carry.

What we claim is:

1. In a photographic exposure meter, in combination, a casing including transparent window means and a fixed indicating portion; light-responsive means located in said casing and including movable pointer means in the region of said window means; a first scale member located in said casing mounted therein for turning movement about an axis, said first scale member having first indicia means in the region of said window means successively indicated by said pointer means during movement thereof; first manually operated means mounted on the outside of one wall of said casing for turning movement and being operatively connected to said first scale member for turning the same about said axis; a second scale member located in said casing mounted therein for turning movement about said axis independently of said first scale member, said second scale member having second indicia means for indicating a desired angular position of said first scale member, and having third indicia means for representing emulsion speeds and located in the region of said window means and of said indicating portion and cooperating with the latter; and second manually operated means mounted on the outside of another wall of said casing for turning movement and being operatively connected to said second scale member for turning the same about said axis to an angular position determined by said third indicia means and by said indicating portion so that said first indicia means can be placed relative to said second indicia means in a desired position relative to said pointer means.

2. In a photographic exposure meter, in combination, an elongated casing having two substantially parallel main walls on opposite sides thereof, one of said walls including transparent window means and a fixed indicating portion; light-responsive means located in said casing near one end thereof between said main walls and including movable pointer means in the region of said window means; a first scale member located in said casing mounted therein for turning movement about an axis, said first scale member having first indicia means in the region of said window means successively indicated by said pointer means during movement thereof; first manually operated means mounted on the outside of one of said main walls of said casing for turning movement and being operatively connected to said first scale member for turning the same about said axis; a second scale member located in said casing mounted therein for turning movement about said axis independently of said first scale member, said second scale member having second indicia means for indicating a desired angular position of said first scale member, and having third indicia means for representing emulsion speeds and located in the region of said window means and of said indicating portion and cooperating with the latter; and second manually operated means mounted on the outside of the other main wall of said casing for turning movement and being operatively connected to said second scale member for turning the same about said axis to an angular position determined by said third indicia means and by said indicating portion so that said first indicia means can be placed relative to said second indicia means in a desired position relative to said pointer means, said first and second scale members being located at the other end of said casing between said main walls so as to be spaced from said light responsive means longitudinally of said casing whereby said main walls are spaced a short distance from each other.

3. In a photographic exposure meter, in combination, a casing having two substantially parallel main walls on opposite sides thereof, one of said walls including transparent observation window means and a small transparent indicating window; light responsive means located in said casing and including movable pointer means in the region of said observation window means; a first scale member located in said casing mounted therein for turning movement about an axis, said first scale member having first indicia means in the region of said observation window means successively indicated by said pointer means during movement thereof, said first scale member having a cutout in the region of said observation window means; first manually operated means mounted on the outside of one of said main walls of said casing for turning movement and being operatively connected to said first scale member for turning the same about said axis; a second scale member located in said casing mounted therein for turning movement about said axis independently of said first scale member, said second scale member having second indicia means representing a factor related to time and cooperating with said cutout for indicating a desired angular position of said first scale member, and having third indicia means for representing emulsion speeds and located in the region of said indicating window; and second manually operated means mounted on the outside of the other main wall of said casing for turning movement and being operatively connected to said second scale member for turning the same about said axis to an angular position determined by said third indicia means and by said indicating window so that said cutout and said first indicia means can be placed relative to said second indicia means in a desired position relative to said pointer means, said first and second scale members being located at the other end of said casing between said main walls so as to be spaced from said light responsive means longitudinally of said casing whereby said main walls are spaced a short distance from each other.

4. In a photographic exposure meter, in combination, a casing having two main walls, one of said walls including transparent window means and a fixed indicating portion; light-responsive means located in said casing and including movable pointer means in the region of said window means; a first scale member located in said casing and including a first disk having first indicia means located in the region of said window means and a shaft means mounted in said one main wall for turning movement about an axis, said first indicia means being successively indicated by said pointer means during movement thereof; a first manually operated knob secured to said shaft and located outside of said casing on said one main wall for turning said first disk about said axis; a second scale member located in said casing and including a second disk opposite said first disk and another shaft means mounted in the other main wall for turning movement about said axis, said second disk having second indicia means for indicating a desired angular position of said first scale member, and having third indicia means for representing emulsion speeds and located in the region of said window means and of said indicating portion and cooperating with the latter; a second manually operated knob secured to said other shaft and located outside of said casing on said other main wall for turning said second disk about said axis to an angular position determined by said third indicia means and by said indicating portion so that said first indicia means can be placed relative to said second indicia means in a desired position relative to said pointer means.

5. In a photographic exposure meter, in combination, a casing having two main walls, one of said walls including larger observation window means and a small indicating window; light-responsive means located in said casing and including movable pointer means in the region of said observation window means; a first scale member located in said casing and including a first disk having a cutout and first indicia means located in the region of said observation window means and a shaft means mounted in said one main wall for turning movement about an axis, said first indicia means being successively indicated by said pointer means during movement thereof; a first manually operated knob secured to said shaft and located outside of said casing on said one main wall for turning said first disk about said axis; a second scale member located in said casing and including a second disk opposite said first disk and another shaft means mounted in the other main wall for turning movement about said axis, said second disk having second indicia means representing a factor related to time and cooperating with said cutout for indicating a desired angular position of said first scale member, and having third indicia means for representing emulsion speeds and located in the region of said indicating window; a second manually operated knob secured to said other shaft and located outside of said casing on said other main wall for turning said second disk about said axis to an angular position determined by said third indicia means and by said indicating window so that said cutout and said first indicia means can be placed relative to said second indicia means in a desired position relative to said pointer means.

6. An exposure meter as set forth in claim 5 wherein said first disk is substantially sector-shaped, wherein said second disk is circular, and wherein said third indicia means are located in a region of said second disk projecting from said first disk.

7. In a photographic exposure meter, in combination, an elongated casing having two substantially parallel main walls on opposite sides thereof, each main wall having a bearing portion inwardly projecting therefrom, said bearing portions being coaxial, one of said walls including transparent window means and a fixed indicating portion; light-responsive means located in said casing near one end thereof between said main walls and including movable pointer means in the region of said window means; a first scale member located in said casing and including a first disk having first indicia means representing aperture stops and being located in the region of said window means and a shaft means mounted in bearing portion of said one main wall for turning movement about an axis, said first indicia means being successively indicated by said pointer means during movement thereof; a first manually operated knob secured to said shaft and located outside of said casing on said one main wall for turning said first disk about said axis; a second scale member located in said casing and including a second disk opposite said first disk and another shaft means mounted in said bearing portion of the other main wall for turning movement about said axis independently of said first scale member, said second disk having second indicia means representing a factor related to time and for indicating a desired angular position of said first scale member, and having third indicia means for representing emulsion speeds and located in the region of said window means and of said indicating portion and cooperating with the latter, said first and second disks being located intermediate said inwardly projecting bearing portions closely spaced from each other; a second manually operated knob secured to said other shaft and located outside of said casing on said other main wall for turning said second disk about said axis to an angular position determined by said third indicia means and by said indicating portion so that said first indicia means can be placed relative to said second indicia means in a desired position relative to said pointer means, said first and second scale members being located at the other end of said casing between said main walls so as to be spaced from said light-responsive means longitudinally of said casing whereby said main walls are spaced a short distance from each other.

8. In a photographic exposure meter, in combination, a casing having first and second main walls, said first wall including transparent window means; light-responsive means located in said casing and including movable pointer means in the region of said window means; a first scale member located in said casing and including a first disk having first indicia means located in the region of said window means and a first shaft means mounted in said first main wall for turning movement about an axis, said first indicia means being successively indicated by said pointer means during movement thereof; a first manually operated knob secured to said first shaft means and located outside of said casing on said first main wall for turning said first disk about said axis; a first resilient means intermediate said first knob and said first main wall for urging said first knob and said first scale member outwardly in axial direction into a position in which said first knob is locked against turning so that depression of said first knob is required for turning said first knob and first scale member; a second scale member located in said casing and including a second disk opposite said first disk and a second shaft means mounted in said second main wall for turning movement about said axis, said second disk having second indicia means for indicating a desired angular position of said first scale member, and having third indicia means located in the region of said window means; a second manually operated knob secured to said second shaft and located outside of said casing on said second main wall for turning said second disk about said axis to an angular position determined by said third indicia means so that said first indicia means can be placed relative to said second indicia means in a desired position relative to said pointer means; and a second resilient means intermediate said second knob and said second main wall for urging said second knob and said second scale member outwardly in axial direction into a position in which said second knob is locked against turning so that depression of said second knob is required for turning said second knob and said second scale member.

9. An exposure meter as set forth in claim 8, wherein said second main wall is recessed in the region of said second knob to prevent accidental turning of the same; wherein said first knob is flat, and wherein said knobs have roughened top faces.

10. An exposure meter as set forth in claim 8 wherein said window means include a small indicating window cooperating with said third indicia means; said third indicia means representing emulsion speeds.

11. An exposure meter as set forth in claim 8 wherein said casing is elongated; wherein said light-responsive means are located at one end of said casing between said two main walls; and wherein said first and second scale members and knobs are located near the other end of said casing whereby said two main walls are closely spaced and said casing is flat.

12. In a photographic exposure meter, in combination, a casing including transparent window means and a fixed indicating portion; light responsive means located in said casing and including movable pointer means in the region of said window means; a first scale member located in said casing mounted therein for turning movement about an axis, said first scale member having first indicia means in the region of said window means successively indicated by said pointer means during movement thereof; first manually operated means mounted on the outside of one wall of said casing for turning movement and being operatively connected to said first scale member for turning the same about said axis; a second scale member located in said casing mounted therein for turning movement about said axis independently of said first scale member, said second scale member having second indicia means for indicating a desired angular position of said first scale member, and having third indicia means for representing emulsion speeds and located in the region of said window means and of said indicating portion and cooperating with the latter; second manually operated means mounted on the outside of another wall of said casing for turning movement and being operatively connected to said second scale member for turning the same about said axis to an angular position determined by said third indicia means and by said indicating portion so that said first indicia means can be placed relative to said second indicia means in a desired position relative to said pointer means; and releasable locking means for locking said second manually operated means.

13. An exposure meter as set forth in claim 12; and including other releasable locking means for locking said first manually operated means.

References Cited in the file of this patent
UNITED STATES PATENTS

| | | |
|---|---|---|
| 2,190,159 | Loewenberg | Feb. 13, 1940 |
| 2,353,163 | Keinath | July 11, 1944 |
| 2,461,930 | Simpson | Feb. 15, 1949 |
| 2,529,337 | Hickok | Nov. 7, 1950 |
| 2,556,431 | Mihalyi | June 12, 1951 |
| 2,628,527 | Rifkin | Feb. 17, 1953 |